(12) United States Patent
Basu

(10) Patent No.: US 7,139,447 B1
(45) Date of Patent: Nov. 21, 2006

(54) ANGULAR DISPERSION AMPLIFICATION METHOD AND APPARATUS FOR OPTICAL DEMULTIPLEXING

(75) Inventor: Santanu Basu, 6710 Abbottwood Dr., Rancho Palos Verdes, CA (US) 90275

(73) Assignee: Santanu Basu, Rancho Palos Verdes, CA (US)

( * ) Notice: Subject to any disclaimer, the term of this patent is extended or adjusted under 35 U.S.C. 154(b) by 460 days.

(21) Appl. No.: 10/126,758

(22) Filed: Apr. 19, 2002

Related U.S. Application Data

(60) Provisional application No. 60/285,746, filed on Apr. 21, 2001.

(51) Int. Cl.
*H04B 10/00* (2006.01)
(52) U.S. Cl. ...................................................... 385/14
(58) Field of Classification Search ............... 385/14, 385/15, 31, 33, 36, 37
See application file for complete search history.

(56) References Cited

U.S. PATENT DOCUMENTS

| | | | | |
|---|---|---|---|---|
| 5,089,711 A * | 2/1992 | Morsell et al. | .......... | 250/492.3 |
| 5,249,201 A * | 9/1993 | Posner et al. | .............. | 375/295 |
| 6,094,285 A * | 7/2000 | Wickham et al. | .............. | 398/1 |
| 6,134,034 A * | 10/2000 | Terahara | .......................... | 398/1 |
| 6,507,597 B1 * | 1/2003 | Graindorge et al. | ......... | 372/102 |
| 6,532,320 B1 * | 3/2003 | Kikuchi et al. | ................ | 385/24 |
| 6,556,297 B1 * | 4/2003 | Cappiello | .................... | 356/328 |
| 6,585,382 B1 * | 7/2003 | Stone | ......................... | 359/839 |
| 6,775,432 B1 * | 8/2004 | Basu | ........................... | 385/24 |
| 6,885,683 B1 * | 4/2005 | Fermann et al. | .............. | 372/25 |
| 2005/0151968 A1* | 7/2005 | Drake et al. | ................. | 356/338 |

FOREIGN PATENT DOCUMENTS

JP 360021031 * 2/1985

* cited by examiner

*Primary Examiner*—Daniel StCyr
(74) *Attorney, Agent, or Firm*—Stetina, Brunda, Garred & Brucker

(57) ABSTRACT

An optical demultiplexer, having an angular dispersion generator followed by an angular amplifier. The angular dispersion generator disperses an incident optical signal into a plurality of channels. While traveling through the angular dispersion amplifier, the channels with incident angles larger than a critical angle are internally totally reflected, and the channels with incident angles smaller than the critical angle are partly reflected, and partly transmitting into an ambient medium. The transmitting part of the channels are thus further dispersed and demultiplexed.

32 Claims, 13 Drawing Sheets

ANGULAR DISPERSION AMPLIFICATION METHOD AND APPARATUS FOR OPTICAL DEMULTIPLEXING

CROSS-REFERENCE TO RELATED APPLICATIONS

This application claims priority to Provisional Application Ser. No. 60/285,746 filed Apr. 21, 2001.

STATEMENT RE: FEDERALLY SPONSORED RESEARCH/DEVELOPMENT (Not Applicable)

BACKGROUND OF THE INVENTION

The present invention relates generally to an optical demultiplexer. More particularly, the invention relates an optical demultiplexer which comprises an angular dispersion generator and an angular dispersion amplifier. Such optical demultiplexer provides a basis for robust designs of multi-channel optical communication receiver, spectrum analyzer, switch and router.

Signal multiplexing is a very important function in optical communication. To increase the system bandwidth, it is common to propagate a number of channels with different optical characteristics over the same carrier such as an optical fiber or a waveguide. The channel multiplexed in the signal are then separated to be routed into individual destinations. Currently, the commonly applied multiplexing technique includes multiplexing various wavelength channels as one signal to be transmitted over a carrier. The conventional dense wavelength division multiplexing (DWDM) technologies are found to be based on: (1) thin-film dielectric devices; (2) diffraction gratings; (3) planar array waveguides; (4) fiber-based devices with Bragg gratings or interferometric structures; and (5) interleave technologies. The current technology limit is near 50 GHz.

Limitations in application of the multiplexing/demultiplexing conventional technologies include the difficulty in distinguishing the channels after being demultiplexed, signal loss during demultiplexing, temperature sensitivity that causes demultiplexing inaccuracy, and complexity in fabrication.

SUMMARY OF THE INVENTION

The present invention provides an optical demultiplexer that can separate and route the channels of a multi-channel optical signal to individual destination. The optical demultiplexer comprises an angular dispersion generator (ADG), followed by at least one angular dispersion amplifier (ADA).

When an input optical signal is incident onto the angular dispersion generator, multiple channels of the optical signal are dispersed and generated thereby. Upon entering the angular dispersion amplifier, an internal reflection interface thereof totally reflects the dispersed channels with incident angles larger than a critical angle thereof. Meanwhile, the dispersed channels with incident angles smaller than the critical angle are partly reflected by the internal reflection interface and partly transmitting into the ambient medium. The transmitting channels are further dispersed, that is, the dispersion of the transmitting channels is amplified by incident from one medium with a larger refractive index into another medium with a smaller refractive index.

More than one angular dispersion amplifier may be incorporated in the optical demultiplexer. For example, a series of angular dispersion amplifiers may follow the angular dispersion generator to obtain a periodic dispersion amplification. That is, as the channels dispersed by the angular dispersion generator travel through more angular dispersion amplifiers, more of the dispersed channels are demultiplexed.

On the other hand, more than one angular dispersion amplifier can be used in the optical demultiplexer to achieve a multi-stage dispersion amplification. As a result, certain portions of the dispersed channels are amplified more than once to enhance the angular dispersion amplification effect.

Further, a plurality of angular dispersion amplifiers can also be arranged in a way that periodic angular dispersion amplification and multi-stage angular dispersion amplification may occur to the same optical demultiplexer.

To reduce the loss of dispersion caused by incident from one medium with a smaller refractive index to the other with a larger refractive index, the angular dispersion generator and the angular dispersion amplifier may be integrated in the same substrate. In addition, to avoid signal loss or interference caused by unwanted reflection, anti-reflection coating may be formed on entering and exiting surfaces of the angular dispersion amplifier.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
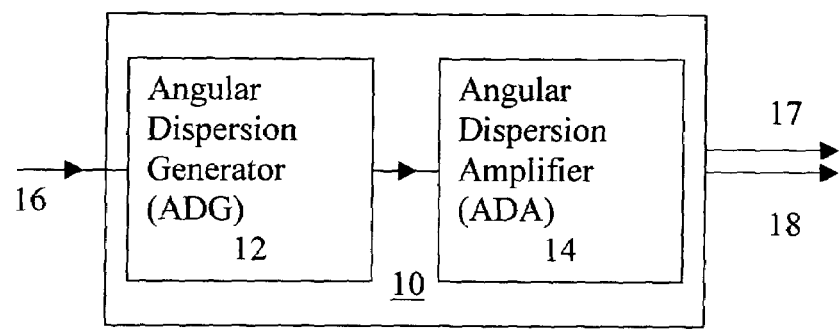
FIG. 1 is a block diagram showing an embodiment of an optical demultiplexer according to present invention.

FIG. 1 shows a block diagram of an optical demultiplexer 10 provided by the present invention. As shown in FIG. 1, the optical demultiplexer 10 comprises an angular dispersion generator 12, followed by an angular dispersion amplifier 14. When an input optical signal 16, preferably a multi-channel signal, is received by optical demultiplexer 10, the angular dispersion generator 12 disperses the input optical signal 16 and separate all the channels thereof. The multiple channels dispersed by the angular dispersion generator 12 are then incident onto the angular dispersion amplifier 14. Thereby, a fraction of the dispersed channels are output with the dispersion thereof amplified as the demultiplexed channels 18, while a fraction of the multiple dispersed channels are reflected as the pass-through channels as denoted by the numeral reference 17.

Figure 2:
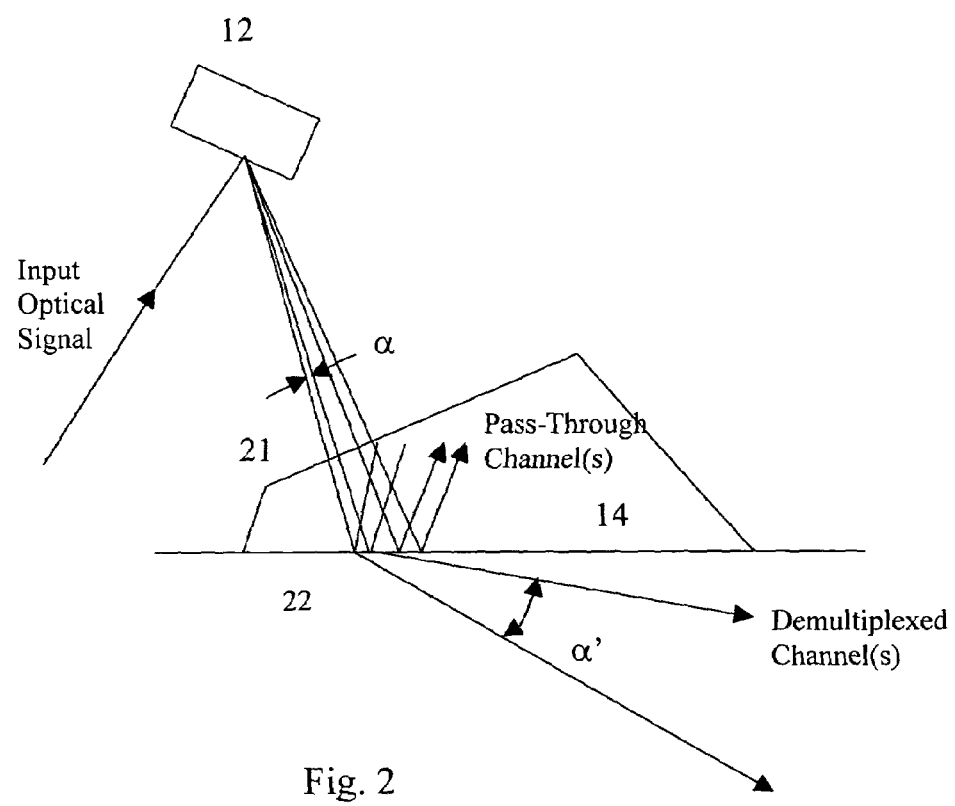
FIG. 2 shows the optical path of an input optical signal traveling through the optical demultiplexer as shown in FIG. 1.

FIG. 2 shows the optical path of the input optical signal traveling through optical demultiplexer 10 as shown in FIG. 1. In FIG. 2, the input optical signal entering the angular dispersion generator 12 is dispersed into multiple channels. The angular dispersion, that is, the angular separation, between two adjacent dispersed channels is denoted by $\alpha$. When the input optical signal is a wavelength-multiplexed signal, the angular dispersion generator 12 includes a wavelength separation element such as a diffraction grating or a prism. As shown in FIG. 2, some of the dispersion $\alpha$ generated by the angular dispersion generator 12 may be insufficient to be routed and demultiplexed to individual destination.

To effectively demultiplex each channel to the respective destination thereof, an angular dispersion amplifier 14 is used in the optical demultiplexer 10 to amplify certain angular dispersion generated by the angular dispersion generator 12. The refractive index of the angular dispersion amplifier 14 is greater than the that of the surrounding ambient medium. Consequently, when the channels are incident on an internal reflection interface 22 of the angular dispersion amplifier 14 with incident angles less than a critical angle thereof, a fraction of the incident channels may transmit through the internal reflection interface 22 with transmission angles larger than the incident angles, while the other fraction of the channels is reflected. On the contrary, when the incident angle is greater than the critical angle, the incident channels are internally totally reflected. In this embodiment, multiple channels have been dispersed by the angular dispersion generator 12. Therefore, these channels are incident onto the internal reflection interface 22 with different incident angles. By adjusting the relative orientation of the internal reflection interface 22, one can control certain dispersed channels with incident angles greater than the critical angle to be totally reflected and output as the pass-through channels. For the channels with incident angles less than the critical angle, a fraction thereof is reflected, while the other fraction thereof transmits through the internal reflection interface 22. The transmitting fraction of the channels, again, incident from one medium to the other with a smaller refractive index, is further dispersed. That is, dispersion $\alpha$ of the transmitted fraction of the channels is amplified as $\alpha'$, where $\alpha' > \alpha$. As a result, the output of the optical demultiplexer 10 includes pass-through channels 17 and demultiplexed channels 18.

Figure 3:
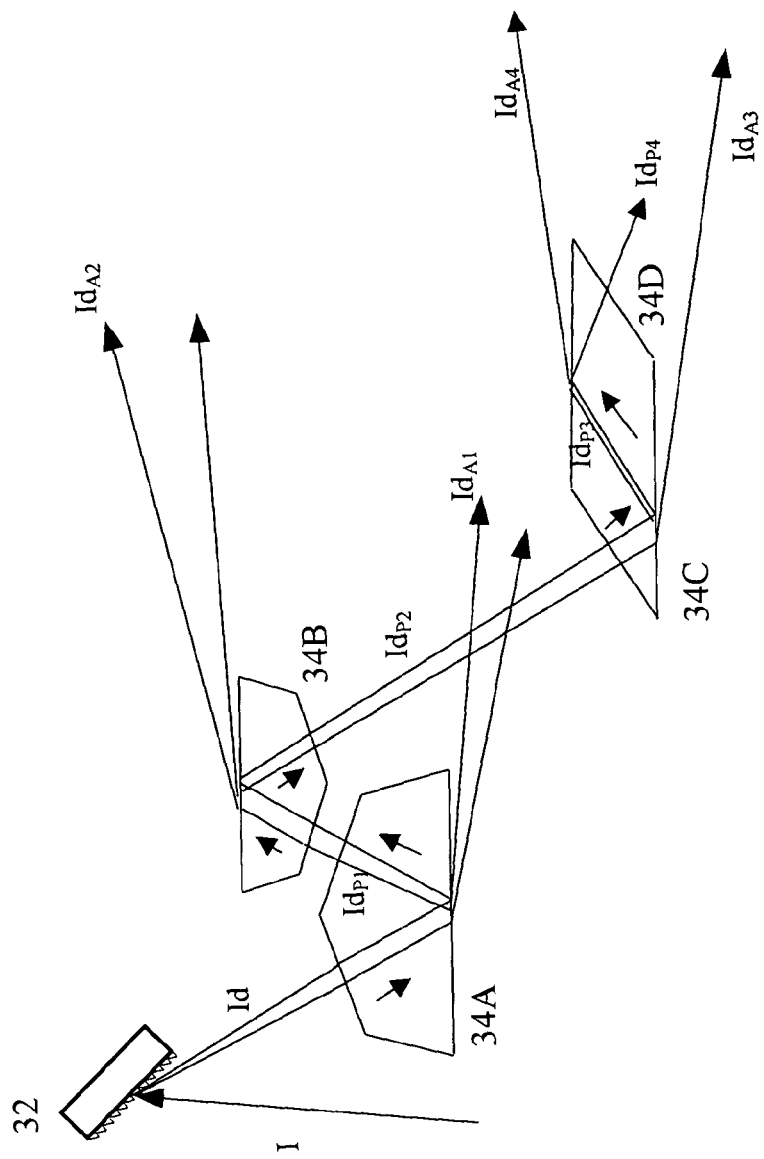
FIG. 3 shows an optical demultiplexer that comprises a series of angular dispersion amplifiers and the periodic angular dispersion amplification performed thereby.

FIG. 3 shows an optical demultiplexer that comprises a series of angular dispersion amplifiers. Similar to the optical demultiplexer 10 as shown in FIG. 1, the input optical signal entering the angular dispersion generator 32 is dispersed into multiple channels. A first angular dispersion amplifier 34A is so positioned that a fraction of the dispersed channels are reflected, while the other fraction of the dispersed channels are further dispersed and transmitting through the internal reflection interface of the first angular dispersion amplifier 34A. The reflected dispersed channels then enter a second angular dispersion amplifier 34B to be processed with the same principle. Again, a fraction of the reflected dispersed channels are further reflected, while the other fraction thereof are demultiplexed and output by the second angular dispersion amplifier 34B. Through the second angular dispersion amplifier 34B, an additional portion of the input optical signal is demultiplexed. The demultiplexing process continues through a chain of periodic angular dispersion amplifiers, where each period has one angular dispersion amplifier. The relative orientation of the internal reflecting interfaces between two adjacent or neighboring angular dispersion amplifiers is optimized according to specific condition of the application. For example, the relative orientation can be selected to limit the range of transmitted signal wavelengths from each interface in the case of wavelength division demultiplexing.

Figure 4:
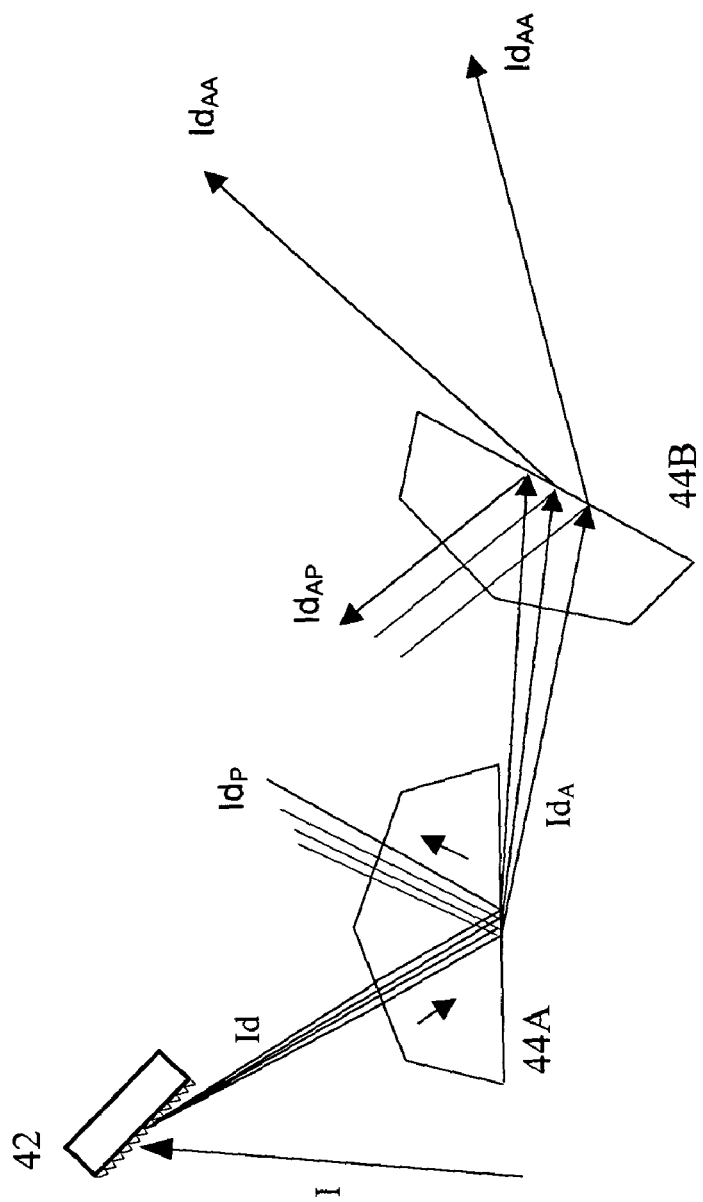
FIG. 4 shows an optical demultiplexer that comprises an optical demultiplexer which further comprises a plurality of angular dispersion amplifiers connected in such a way that multi-stage angular dispersion amplification is performed.

FIG. 4 shows a multi-stage angular dispersion amplification for an optical signal. In FIG. 4, more than one angular dispersion amplifiers 14 (FIG. 1) are serially disposed in the optical demultiplexer for performing more than one angular dispersion amplification on certain fraction of the input optical signal. For example, an input optical signal is dispersed by the angular dispersion generator 42 into multiple channels. These channels, upon incident onto the first internal reflection interface of the first angular dispersion amplifier 44A, are split into pass-through channels and demultiplexed channels. The demultiplexed channels are resulted from those dispersed channels with incident angles less than the critical angle of the first internal reflection interface. The demultiplexed channels further enter a second angular dispersion amplifier 44B, and are further split into pass-through channels and multiplexed channels by the second internal reflection interface thereof. As shown in FIG. 4, the channels that have been demultiplexed more than once have larger dispersion compared to the channels that have never been demultiplexed, or only been demultiplexed once.

Figure 5:
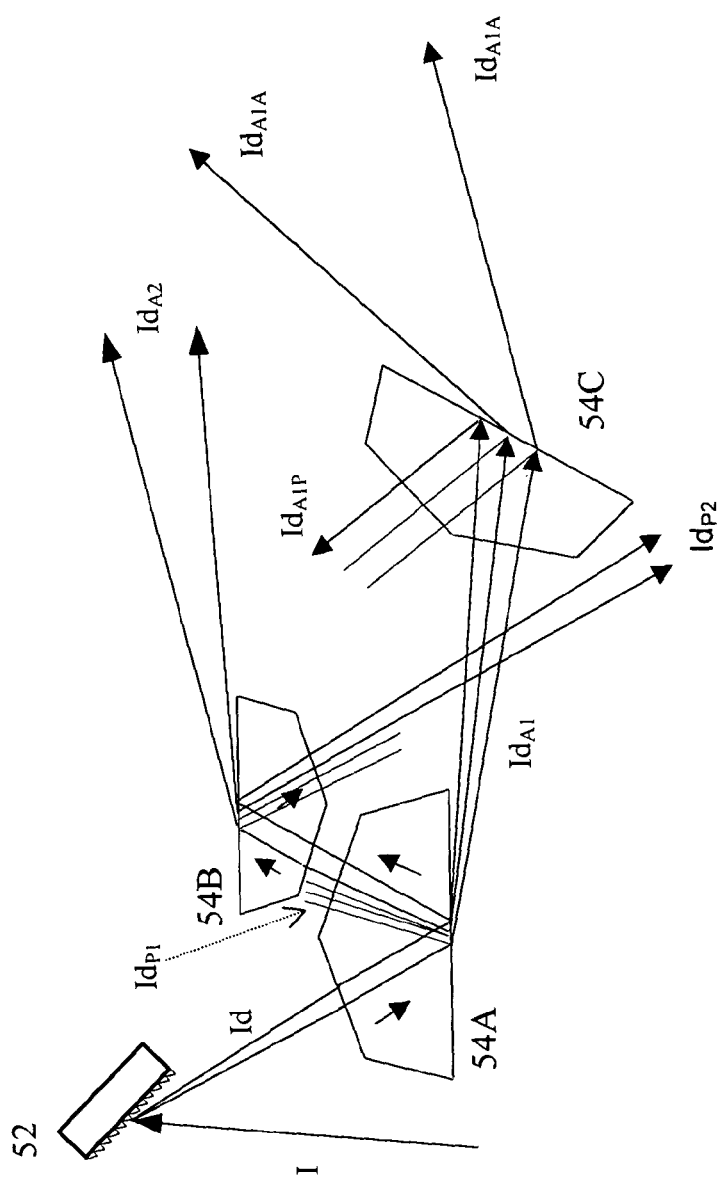
FIG. 5 shows a combination of a periodic angular dispersion amplification and a multi-stage angular dispersion amplification.

FIG. 5 shows a combination of a periodic angular dispersion amplification as shown in FIG. 3 and a multi-stage angular dispersion amplification as shown in FIG. 4. The optical demultiplexer as illustrated in FIG. 5 allows an input optical signal to be demultiplexed in various stages, in a series/parallel arrangement of dispersion amplifiers, and also allows angular dispersion of the demultiplexed channels to be amplified more than once. As shown at FIG. 5 the input optical signal traveling along optical path 50 is partially reflected/refracted to define optical paths 50A, 50B, towards angular dispersion amplifiers 54B, 54C, respectively. As such, the same signal channels may be communicated along multiple optical paths, arrayed in parallel, to permit selective extraction of a particular channel at multiple locations.

Figure 6:
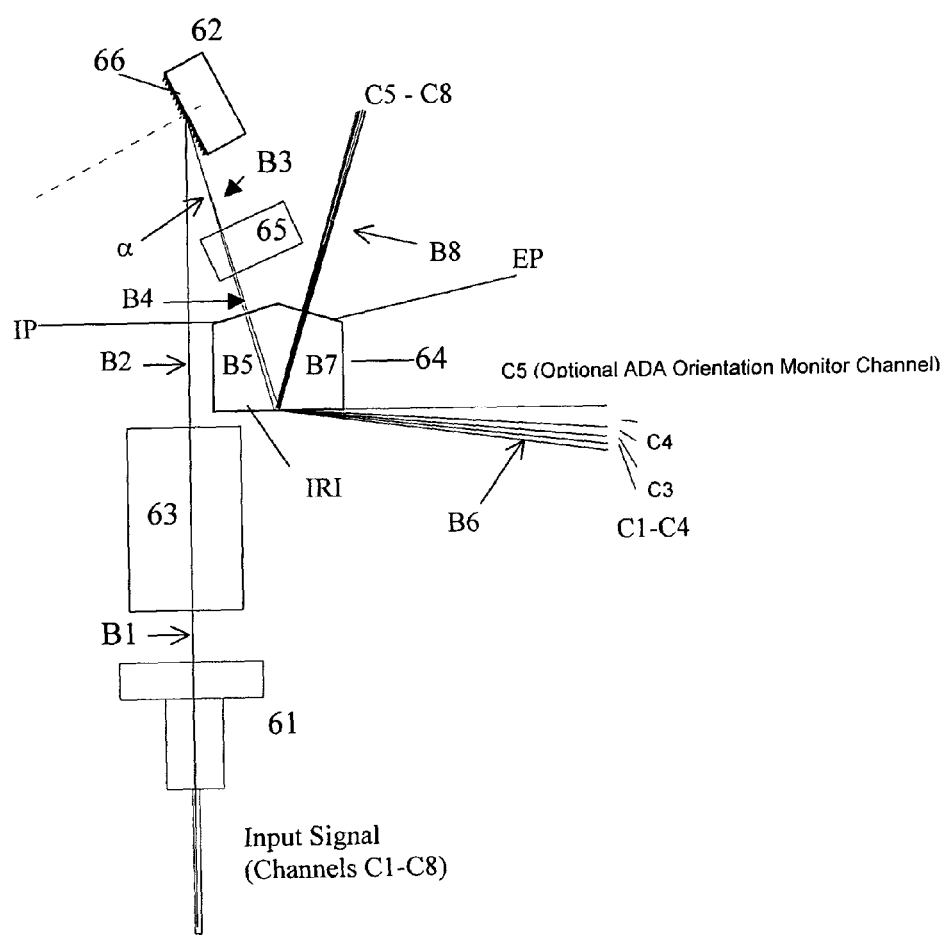
FIG. 6 illustrates the detailed structure and operation of an optical demultiplexer according to the present invention.

FIG. 6 shows a detailed structure and operation of an exemplary optical demultiplexing system provided by the present invention. In FIG. 6, the input optical signal may be, for example, an optical signal multiplexed with multiple wavelength channels C1 to C8. The multiplexed input optical signal is carried by a carrier, for example, an optical fiber or a waveguide, and collimated into a collimated beam B1 by a collimator 61 before entering the optical demultiplexer. As dispersion of the input signal is related to the polarization thereof, polarization optics is applied to the incident collimated beam B1 in this embodiment. In addition, to optimize the demultiplexing effect, optional imaging/beam shaping optics are also applied to the incident beam B1 in this embodiment. The collimated beam B1 thus further travels through an optional imaging/beam shaping/polarization optics 63 before entering the angular dispersion generator 62 of the optical demultiplexer.

The optical demultiplexer comprises the angular dispersion generator 62 and an angular dispersion amplifier 64. For the multi-wavelength optical signal, a diffraction grating or prism, such as grating 66, may be used as the angular dispersion generator 62 to disperse the input optical signal into beams B3 with various wavelength channels C1 to C8. A polarizer 65 may be disposed between the angular dispersion generator 62 and the angular dispersion amplifier 64 to polarize the dispersed beams B3 into B4. The beams B4 then enter the angular dispersion amplifier 64 from the inclined plane I1, that is, the incident plane I1 thereof as the beams B5. Again, the refractive index of the angular dispersion amplifier 64 is greater than that of the surrounding medium; therefore, the Beams B5 incident onto the internal reflection interface I2 are split into the pass-through channels B8 and the demultiplexed channels B6. In this embodiment, the channels C1 to C4 are incident onto the internal reflection interface I2 with incident angle smaller than the critical angle. As a result, a fraction of the channels C1 to C4 are further dispersed by the angular dispersion amplifier 64 and demultiplexed. In addition, the channel C5 is incident onto the internal reflection interface I2 with a near critical angle. Therefore, when the angular dispersion amplifier 64 is slightly reoriented, the channel C5 may transmit through the internal reflection interface I2 and converts from a pass-through channel to a demultiplexed channel. The channel C5 can thus be used as an indication to monitor the orientation of the angular dispersion amplifier 64. Further, anti-reflection coating may be applied to the inclined planes I1 and I3 to avoid loss caused by unwanted reflection.

In one specific embodiment, the beam B1 comprises 8 channels of optical signal, of which the wavelengths range from 1550.12 nm to 1552.92 nm, in which each two neighboring channels are spaced with each other by an optical frequency of 50 GHz.

The beam B1 may be produced in many ways. In the presently preferred embodiment, the beam B1 is produced by collimating a light signal coming from a 9 μm core single-mode fiber with a lens having a focal length of 11 mm. The beam size is 2.9 mm and a divergence angle thereof is about 0.046° (0.8 mrad). The optional optics 65 may comprise an anamorphic prism pair to reduce the beam size along the axis which is perpendicular to the plane of the grating angular dispersion. For gratings which are optimized with respect to polarization, and when the input beam is polarized, the optional optics 65 may further comprise polarization rotation optics to maximize grating diffraction efficiency.

For this example, the diffraction grating angular dispersion generator 62 is a 1200 lines per mm flat grating, on which the beam B2 is incident at an angle of 61.9°. The diffracted angle ranges from −77.963° to −78.926° in the first order of the channels C1 to C8. The beam divergence angle is roughly 3 times less than the angular separation between adjacent channels which is 0.132°. The grating resolution is approximately 27 GHz.

The beam B3 passes through the optional optic 65, which in this case is a polarization rotator to maximize transmission at the internal reflection interface I2 of the angular dispersion amplifier 64.

FIGS. 8A to 13B show various optics applicable for use as the angular dispersion amplifier 64. The following example using the truncated prism illustrated in FIGS. 10A and 10B gives a quantitative explanation of the operation of the optical demultiplexer. The prism illustrated in FIG. 10A has inclined truncated surfaces resulting in a pentagonal cross section. The truncation reduces the size of the angular dispersion amplifier. The selection of material of the angular dispersion amplifier is significant in optimizing the performance of angular dispersion amplifier. In this example, silicon (Si) is used as the material for fabricating the angular dispersion amplifier. The refractive index of silicon at 1550 nm is about 3.4795. Therefore, when the surrounding ambient medium is air, the critical angle is 16.7°. For this example, the top sides of the pentagonal angular dispersion amplifier, that is, the planes I1 and I3 as shown in FIG. 6, are oriented at near 16.7° with respect to the 18 mm long base, which is the internal reflection interface I2 in FIG. 6. Further, the top sides I1 and I2 may be coated with anti-reflection coating. The thickness of the prism is 12 mm, which is sufficient for the beam with a 2.9 mm diameter, and is easy for handling.

In the above example, transmission from the air to the angular dispersion amplifier through the incident plane I1 reduces the angle separation, that is, dispersion imposed by the grating of the angular dispersion generator 62. The angular dispersion between channels 1 through 8 is calculated to be 0.277° within the angular diversion amplifier 64. The orientation of the angular dispersion amplifier 64 is chosen with respect to the grating such that the incident angle of channel 1 is 16.55° on the internal reflection interface I2. Meanwhile, the channel 5 is incident onto the internal reflection interface I2 with an incident angle slightly less than the critical angle, while the channel 6 is incident with an incident angle slightly larger than the critical angle. For this example, the wavelength, the transmission angles, the p-polarized and sigma-polarized transmission fractions for the channels 1 to 4 at the internal reflection interface I2 are calculated as Table 1.

TABLE 1

| Channel | Wavelength (nm) | Transmission Angle (°) | P-polarized Transmission Fraction | Sigma-Polarized Transmission Fraction |
|---------|-----------------|------------------------|-----------------------------------|----------------------------------------|
| 1 | 1550.12 | 82.3 | 88.1% | 14.9% |
| 2 | 1550.52 | 83.3 | 83.6% | 13.1% |
| 3 | 1550.92 | 84.5 | 76.5% | 10.8% |
| 4 | 1551.32 | 86.1 | 63.5% | 7.8% |

In the above example, Channels 6 through 8 are totally internally reflected at the internal reflection interface I2 as beam B7. Because a great reduction in transmission would occur with an incident angle very close to the critical angle, and because of finite divergence of the incident beam, a significant part of the channel 5 is expected to remain in the beam B7. The transmitted channel 5 is a sensitive function of the orientation of the angular dispersion amplifier; therefore, it can be used to control and monitor the orientation of the angular dispersion amplifier. The beam B7 exits the angular dispersion amplifier 64 from the inclined interface I3 and becomes the beam B8. The angle dispersion, that is, the angular separation, between the channels of the beam B8 is nearly the same as that between the channels of the beam B4 before entering the angular dispersion amplifier 64. In this example, the beam B8 exiting the angular dispersion amplifier contains most of the sigma-polarized component of channels 1 to 8, and most of the p-polarized component of the channels 5 to 8. Most of the p-polarized component of the channels 1 to 4 is demultiplexed from the optical signal by the angular dispersion amplifier 64.

The angular dispersion amplification is defined as the ratio of the angular separation between the channels after transmitting through the internal reflection interface of the angular dispersion amplifier to the angular separation between the channels before entering the angular dispersion amplifier. In this particular example with silicon as the material of the angular dispersion amplifier 64, the angular dispersion amplification of the channel 1 is at least 7.6, and the transmitted fraction of the p-polarization of the channel 4 is at least 63.5.

Figure 7A:
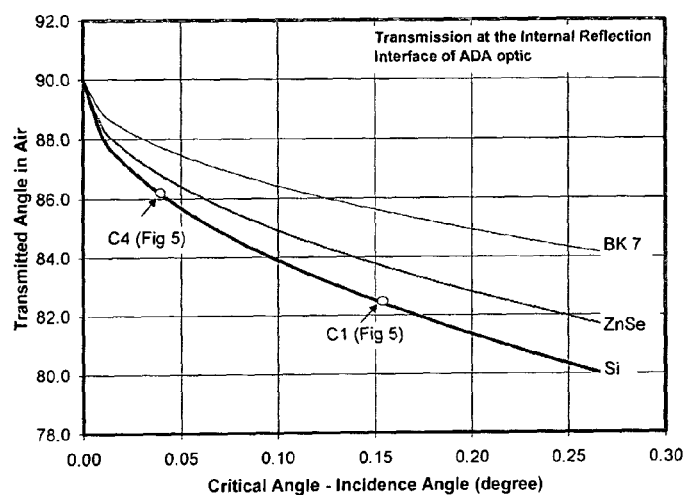
FIGS. 7A and 7B shows the dependence of angular dispersion amplifier angular dispersion amplification performance on refractive index thereof.
Figure 7B:
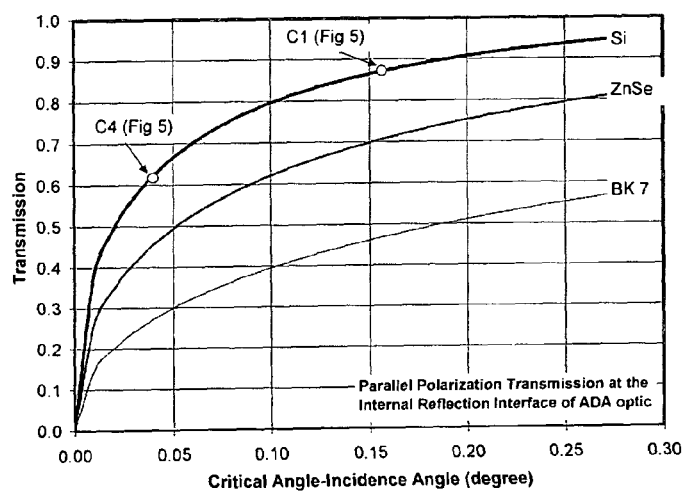

FIGS. 7A and 7B show the material dependent transmission and transmission angle. Three materials, including BK7 glass with the refractive index n approximately equal to 1.5, zinc selenide (ZnSe) with n equal to about 2.46, and silicon with n of about 3.4 are compared. These three materials have low absorption at 1550 nm of wavelength and can be grown in sizes required for the angle-separation optic. For those materials with difficulty to grow in large sizes, diffusion bonding and laminating processes may be applied to produce a useful sized material. FIG. 7A shows the transmitted angle as a function of incident angle of the incident channel at the internal reelection interface I2. For a mere 0.25° change of incident angle, the transmitted angle changes by 9.7° for silicon material and 5.8° for BK7.

FIG. 7B shows the transmission fraction of the incident beam as a function of incident angle at the internal reflection interface. When the incident angle is 0.25° less than the critical angle, the transmission fraction of is 0.93 in silicon material and 0.55 in BK7. The transmitted angles and the transmission fraction for channels 1 and 4 in the specific example of FIG. 6 are also indicated in FIGS. 7A and 7B. As shown in FIGS. 7A and 7B, it is possible to have a combination of very high transmission and angular dispersion amplification in a properly designed angular dispersion amplifier made of a high refractive index and low absorption material.

Figure 8A:
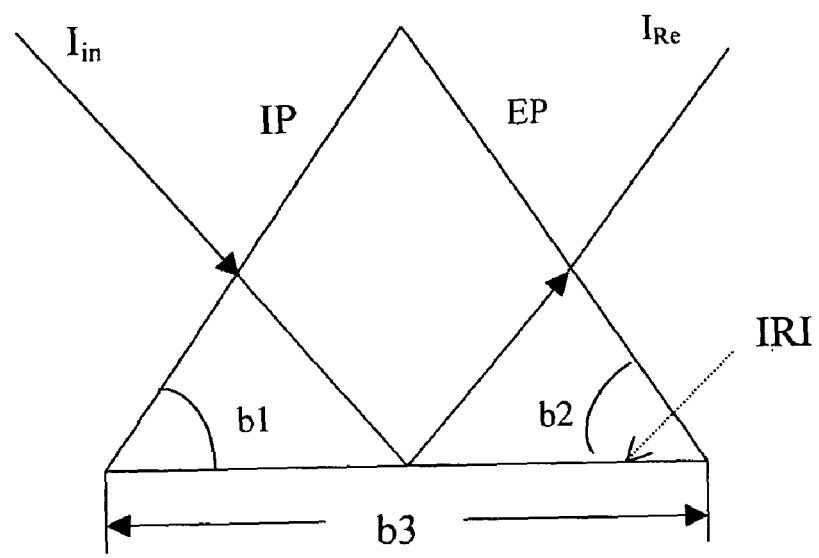
FIGS. 8A to 13B show various optics of the angular dispersion amplifier.
Figure 8B:
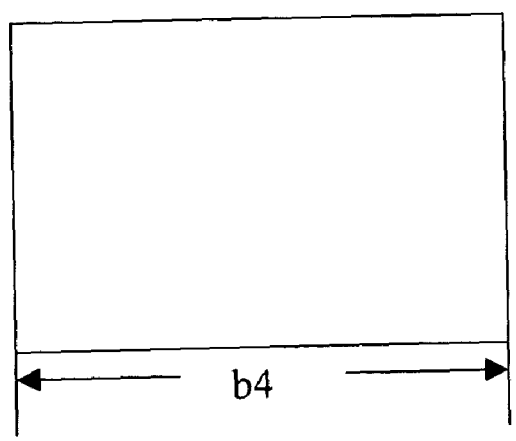

Referring to FIGS. 8A to 13B, different constructions of the angular dispersion amplifier are illustrated. FIG. 8A shows the simple structure, that is, a prism. The prism angles b1 and b2 and the base length b3 can be optimized. For example, b1 and b2 may be chosen to be approximately equal to the critical angle for the prism material/surrounding medium combination. For a prism material with the refractive index n equal to 1.5, b1 and b2 are approximately 41.8°. Under such circumstance, the signal to be demultiplexed can enter prism with a near normal incident angle and exit the prism also at near normal angle. The inclined faces where the beam enters and exits can be coated with anti-reflection coating. The base length b3 may be optimized to give the beam size and packaging size constraints. For example, a 20 mm base length is sufficient for a 3 mm diameter beam. FIG. 8B shows a cross sectional view of the prism as shown in FIG. 8A. The thickness of the prism as shown in FIG. 8A is denoted as b4.

Figure 9:
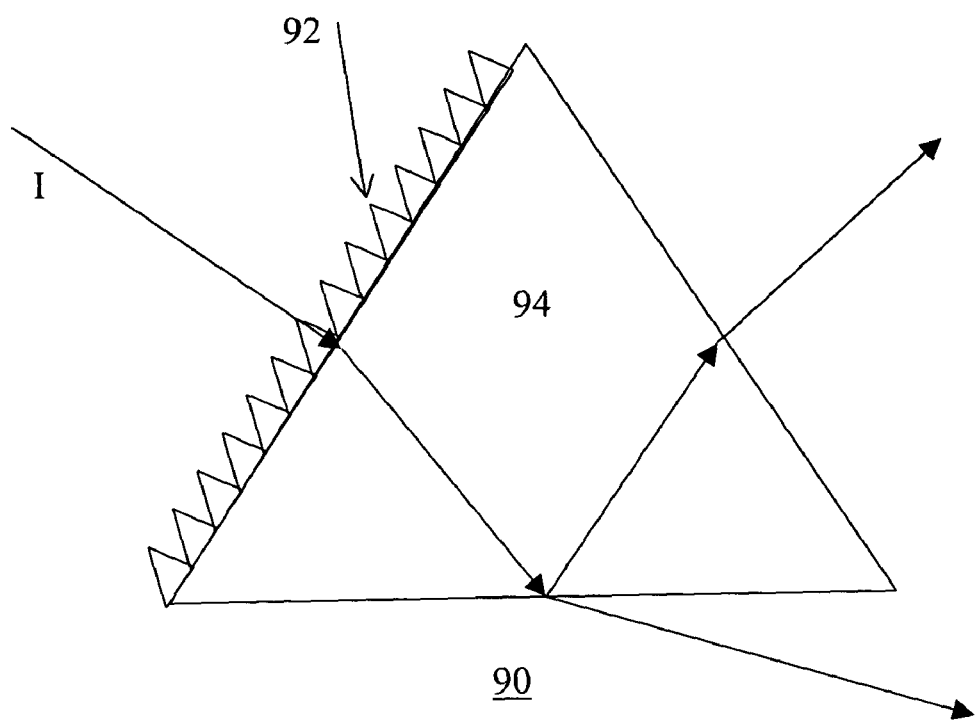

FIG. 9 shows an integration of an angular dispersion generator 92 and an angular diversion amplifier 94. The common integrated structure 90 comprises a transmission grating 95 formed on an inclined face of a prism 91, where the transmission grating functions as the angular dispersion generator 92, while the prism functions as the angular dispersion amplifier 94. In the previously-introduced embodiment, the angular dispersion generated by the angular dispersion generator is reduced by transmission from a medium with a lower refractive index to another medium with a high refractive index. That is, the dispersion generated by the angular dispersion generator is reduced while entering the angular dispersion amplifier from the air. However, the integrated structure provided in this embodiment offers the advantage of applicability of low resolution grating since the angular dispersion generation and amplification are commenced in the same medium. This design also allows a compact integrated demultiplexer by integrating two functions, that is, angular dispersion generation and amplification in one optic substrate.

Figure 10A:
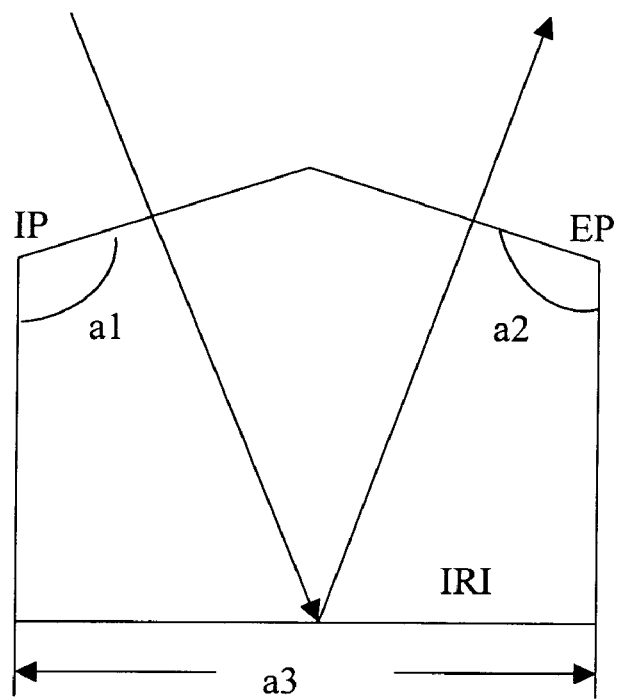
Figure 10B:
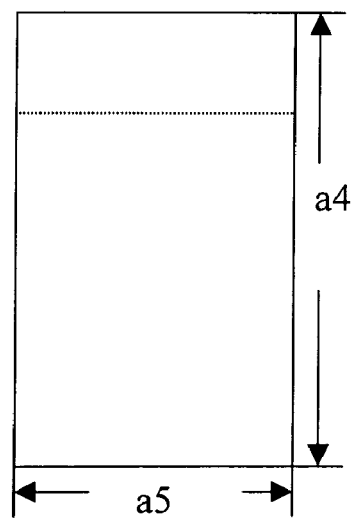

The example of an angular dispersion amplifier shown in FIGS. 10A and 10B has been described above. In FIG. 10A, a prism is truncated to give a pentagon shaped cross section. This size is convenient for high index material such as silicon or zinc selenide of which the critical angles are small, and a prism construction as shown in FIG. 8A that requires a larger size. For refractive index n=2.4 and a 3 mm diameter incident beam, a1 and a2 can be determined as 114°, while a3, a4 and a5 can be set up as 18.5 mm, 12 mm, and 12 mm, respectively.

Figure 11A:
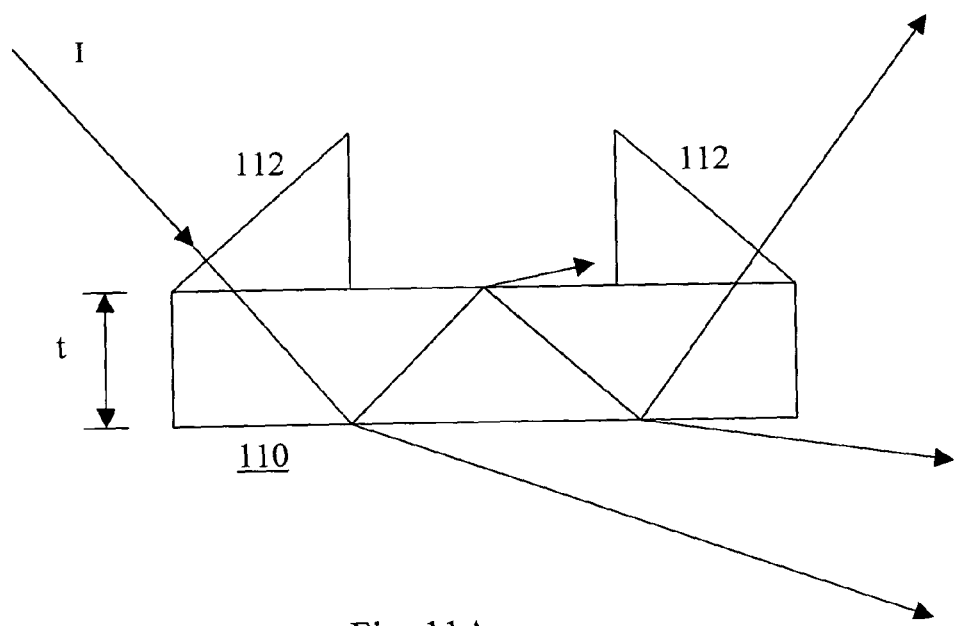
Figure 11B:
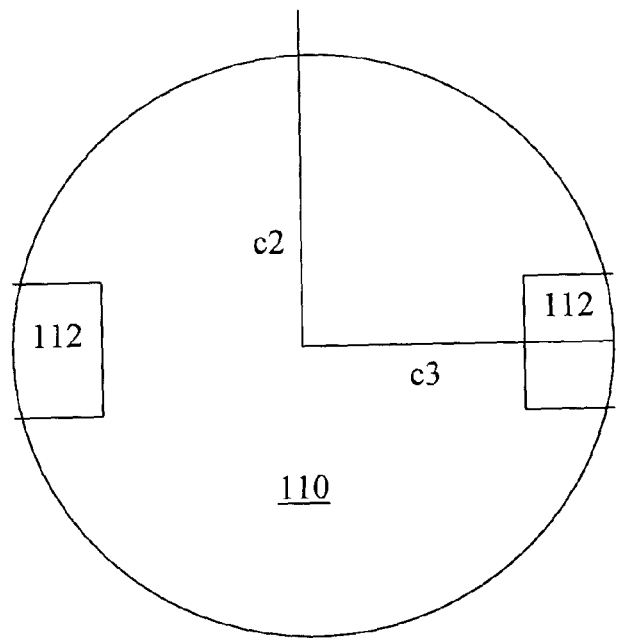

FIGS. 11A and 11B show the example of using a commonly available round optical wedge window as a periodic angular dispersion amplifier. The dispersion generation and amplification are similar to that illustrated in FIG. 3. The wedge angle along the beam propagation direction is variable upon rotation of the wedge. For example, when the wedge angle is 0.5° along the axis c3 and 0° along axis c2, the relative orientation between the successive angular dispersion amplifier interfaces along the beam propagation can be adjusted between 0° and 0.5° by rotating the wedge on its base. The input and pass-through optical signals may be coupled in using prism coupler. The nominal thickness c1 of the wedge optic may be optimized depending on the beam size, the refractive index of the angular dispersion amplifier, number of the channels and packaging considerations. A typical value of c1 is about 1 to 25 mm.

Figure 12A:
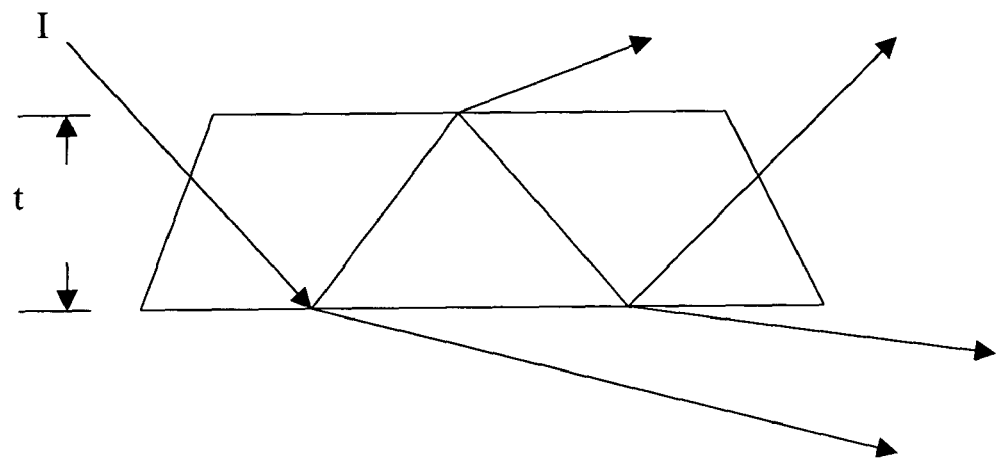
Figure 12B:
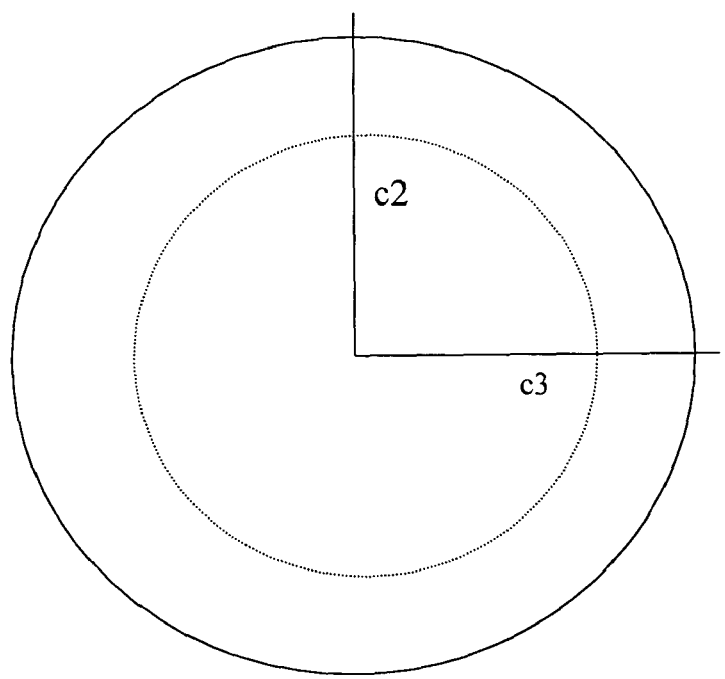

FIGS. 12A and 12B show the use of a round optical wedge with its edges at an inclination angle and all surfaces polished for low loss optical transmission. In this design, no coupling prisms are necessary since the beams can be coupled in and out through the inclined edge face. Again, the relative orientation of the periodic angular dispersion amplifier interfaces can be varied by rotating the angular dispersion amplifiers. Optic wedge directions are c2 and c3, and the nominal thickness is c1 as shown in FIG. 11A. A typical value of c1 is about 1–25 mm.

Figure 13A:
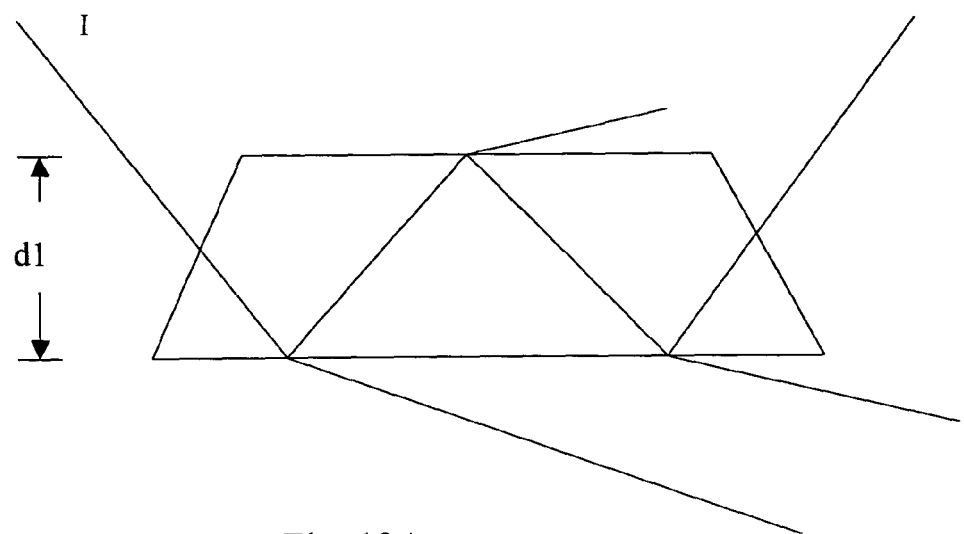
Figure 13B:
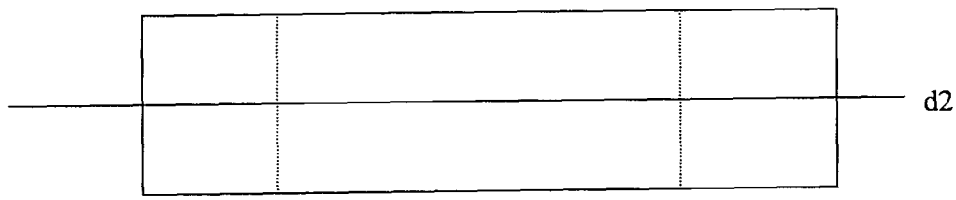

FIGS. 13A and 13B show the use of a wedged slab for periodic angular dispersion amplifier application. The wedge angle direction may be varied but is shown as d2 along the long axis of the slab, and the nominal thickness d1 is typically about 1–25 mm.

Figure 14:
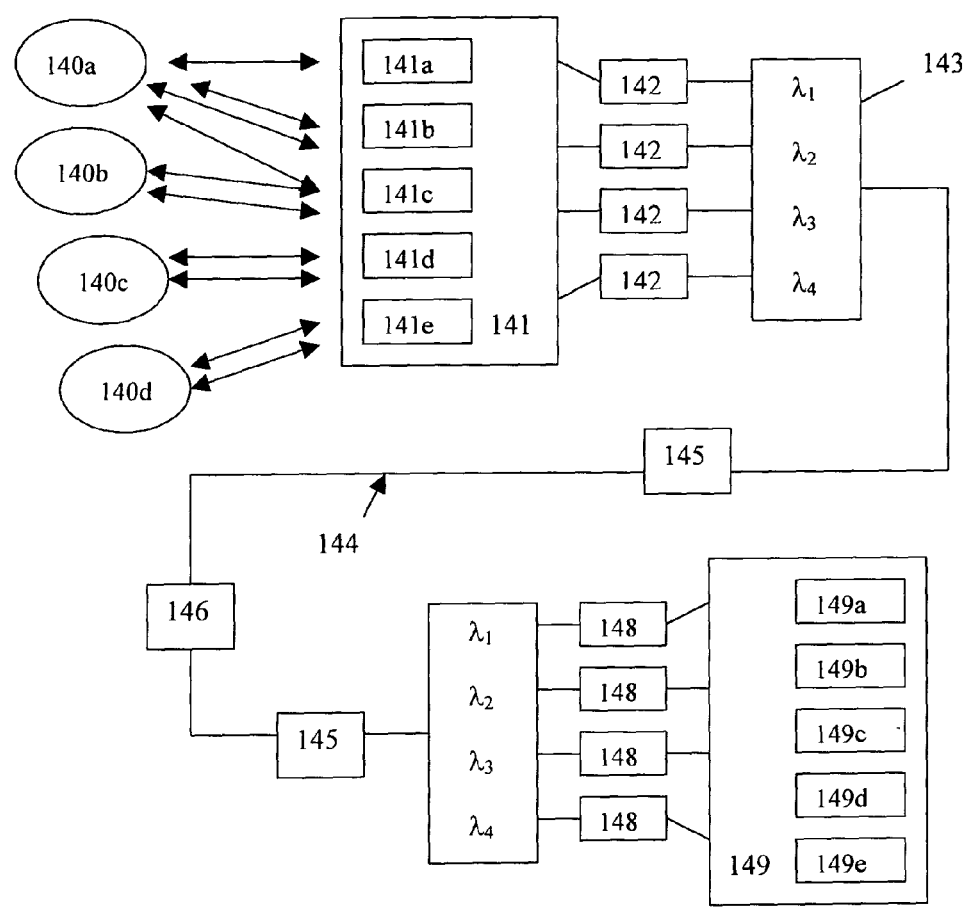
FIG. 14 shows a network communication system implementing the demultiplexer provided by the present invention.

FIG. 14 shows a communication network using the demultiplexer provided by the present invention. As shown input data may come from a variety of sources 140a to 140d. A cross connect switch 141 having transceivers 141a to 141e are provide to assign a transmitter 142 operating at a specific wavelength for the data stream supplied from each of the sources 140a to 140d. The output from the transmitter 142 is multiplexed by a multiplexer 143 for transporting over a length of common transport fiber 144. The common transport fiber 144 may comprise sections for amplifications 145 and section for adding and dropping signals 146. These channels then enter the demultiplexer 147 and are separated and routed to specific receivers 148 and the cross connect switch 149, in which various kinds of transceivers 149a to 149e may be installed. By implementing the demultiplexer as shown in FIGS. 1–13 into the network system as shown in FIG. 14, the channels can be selectively demultiplexed and respectively received in the receiving ends.

Accordingly, the optical demultiplexer provided by the present invention offers the benefit of:

1) 50 GHz capability with scalable number of channels, and flexible wavelength of operation;

2) better loss uniformity and low loss talk;

3) much improved temperature insensitivity;

4) among the best insertion loss characteristic;

5) compact packaging for 50 GHz devices; and 6) ease of manufacturability.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. An optical demultiplexer, comprising:
   an angular dispersion generator, operative to disperse an incident optical signal into a wavelength plurality of channels each being angularly separated from at least one of the others; and
   an angular dispersion amplifier, operative to receive the dispersed optical signal and amplify an angular separation of at least one of the wavelength channels with respect to at least one other wavelength channel in the angularly dispersed optical signal,
   wherein the angular dispersion amplifier comprises an internal reflection interface with a critical angle, and wherein the channels which are further dispersed having an incident angle smaller than the critical angle.

2. The optical demultiplexer as recited in claim 1, wherein the angular dispersion generator comprises a wavelength separation element.

3. The optical demultiplexer as recited in claim 1, wherein the angular dispersion generator comprises a diffraction grating.

4. The optical demultiplexer as recited in claim 1, wherein the angular dispersion generator comprises a prism.

5. The optical demultiplexer as recited in claim 1, wherein the angular dispersion amplifier has a refractive index greater than that of a surrounding ambient medium.

6. The optical demultiplexer as recited in claim 1, wherein the angular dispersion generator and the angular dispersion amplifier are integrated in a common structure.

7. The optical demultiplexer as recited in claim 1, further comprising a polarizer disposed between the angular dispersion generator and the angular dispersion amplifier.

8. The optical demultiplexer as recited in claim 1, further comprising an anti-reflection coating on at least one surface of the angular dispersion amplifier.

9. The optical demultiplexer as recited in claim 1, wherein the angular dispersion amplifier includes a round optical wedge window, which has a wedge with an wedge angle along which propagation direction of an incident signal is variable upon rotation of the wedge.

10. The demultiplexer as recited in claim 1, wherein the angular dispersion amplifier has an internal reflection interface which totally reflects the remaining channels that are not further dispersed by the angular dispersion amplifier.

11. The demultiplexer as recited in claim 1, wherein the angular dispersion amplifier comprises a prism truncated to have a pentagonal cross section.

12. The demultiplexer as recited in claim 1, wherein the angular dispersion amplifier includes a round optical wedge window, which further comprises a round optical window having a perimeter and two wedges located on two distal parts of the perimeter.

13. The demultiplexer as recited in claim 1, wherein the angular dispersion amplifier includes a round optical edge having an inclined edge and a plurality of surfaces polished for low loss optical transmission.

14. The demultiplexer as recited in claim 1, wherein the angular dispersion amplifiers includes a wedge slab having two inclined ends.

15. The demultiplexer as recited in claim 1, further comprising an additional angular dispersion amplifier disposed along an optical path of the channel further dispersed by the angular dispersion amplifier.

16. The demultiplexer as recited in claim 1, further comprising an additional angular dispersion amplifier disposed along an optical path of the channels that are not further dispersed by the angular dispersion amplifier.

17. The demutiplexer as recited in claim 1, wherein the angular dispersion generator comprises an element to induce optical interference.

18. A method of multiplexing an input, multichannel optical signal, comprising:
   communicating the input optical signal to an angular dispersion generator;
   dispersing the input optical signal to define a plurality of angular dispersion channels;
   communicating a plurality of the channels to be incident upon at least one angular dispersion amplifier having an internal reflection interface; and
   adjusting the orientation of the internal reflection interface with respect to the incident angles of the channels, such that the channels having incident angles larger than a critical angle at the internal reflection interface are internally reflected, and the channels having incident angles smaller than the critical angle are partly transmitted through the internal reflection interface.

19. An optical demultiplexer, comprising:
   an angular dispersion generator, operative to disperse an incident optical signal into a wavelength plurality of channels each being angularly separated from at least one of the others; and
   an angular dispersion amplifier, operative to receive the dispersed optical signal and amplify an angular separation of at least one of the wavelength channels with respect to at least one other wavelength channel in the angularly dispersed optical signal;
   wherein the angular dispersion amplifier has an internal reflection interface which totally reflects the remaining channels that are not further dispersed by the angular dispersion amplifier.

20. The demultiplexer as recited in claim 19, wherein orientation of the internal reflection interface is adjustable, such that the number of the channels to be further dispersed by the angular dispersion amplifier is controllable.

21. The demultiplexer as recited in claim 19, wherein the angular dispersion generator includes a grating, the angular dispersion amplifier includes a prism, and the grating is directly attached on an inclined surface of the prism.

22. The demultiplexer as recited in claim 21, wherein the angular dispersion amplifier includes a prism that has two inclined surfaces and an internal reflection interface.

23. A demultiplexer for selectively demultiplexing a multi-channel signal, comprising:
   an angular dispersion generator, operative to receive an input multi-channel signal, and to split the multi-channel signals into a plurality of angularly dispersed channels separated from each other by an angular dispersion;
   a first angular dispersion amplifier, operative to receive the angularly dispersed channels and to selectively extract a first fraction of the angularly dispersed channels by amplifying the angular dispersion thereof; and at least one second angular dispersion amplifier so arranged to selectively extract at least a second fraction of the angularly dispersed channels by amplifying angular dispersion.

24. The demultiplexer as recited in claim 23, wherein a material for forming the angular dispersion amplifier includes silicon.

25. The demultiplexer as recited in claim 23, wherein the angular dispersion generator, the angular dispersion amplifier, an optical path of the input multi-channel signal, and at least one optical path of the angularly dispersed channels are integrated into a common substrate.

26. A demultiplexer for selectively demultiplexing a multi-channel signal, comprising:

an angular dispersion generator, operative to receive an input multi-channel signal, and to split the multi-channel signals into a plurality of angularly dispersed channels separated from each other by an angular dispersion;

a first angular dispersion amplifier, operative to receive the angularly dispersed channels and to selectively extract a first fraction of the angularly dispersed channels by amplifying the angular dispersion thereof;

wherein the first angular dispersion amplifier has an internal reflection interface with a critical angle such that the angularly dispersed channels incident onto the internal reflection interface with an incident angle smaller than the critical angle are partly reflected and partly transmitted, while the angularly dispersed channels incident onto the internal reflection interface with an incident angle larger than the critical angle are totally reflected.

27. The demultiplexer as recited in claim 26, wherein orientation of the internal reflection interface relative to the incident angles of the angularly dispersed channels is adjustable such that selection of the first fraction of the angularly dispersed channels is tunable.

28. The demultiplexer as recited in claim 26, further comprising a dispersion adjusting means for applying an external force to the angular dispersion generator, so as to modify angular dispersion of the angularly dispersed channels generated by the angular dispersion generator.

29. An optical demultiplexer, comprising:

an angular dispersion generator, operative to disperse an incident optical signal into a wavelength plurality of channels each being angularly separated from at least one of the others; and an angular dispersion amplifier, operative to receive the dispersed optical signal and amplify an angular separation of at least one of the wavelength channels with respect to at least one other wavelength channel in the angularly dispersed optical signal;

wherein the angular dispersion amplifier comprises an internal reflection interface with a critical angle, and wherein the channels which are internally totally reflected have incident angles larger than the critical angle.

30. An optical demultiplexer, comprising:

an angular dispersion generator, operative to disperse an incident optical signal into a wavelength plurality of channels each being angularly separated from at least one of the others; and an angular dispersion amplifier, operative to receive the dispersed optical signal and amplify an angular separation of at least one of the wavelength channels with respect to at least one other wavelength channel in the angularly dispersed optical signal;

wherein the angular dispersion amplifier includes a round optical wedge window, which has a wedge with an wedge angle along which propagation direction of an incident signal is variable upon rotation of the wedge.

31. A demultiplexer for selectively demultiplexing a multi-channel signal, comprising:

an angular dispersion generator, operative to receive an input multi-channel signal, and to split the multi-channel signals into a plurality of angularly dispersed channels separated from each other by an angular dispersion;

a first angular dispersion amplifier, operative to receive the angularly dispersed channels and to selectively extract a first fraction of the angularly dispersed channels by amplifying the angular dispersion thereof; and at least one second angular amplifier so arranged to further amplify the angular dispersion of the first fraction of the angularly dispersed channels extracted by the first angular dispersion amplifier.

32. A demultiplexer for selectively demultiplexing a multi-channel signal, comprising:

an angular dispersion generator, operative to receive an input multi-channel signal, and to split the multi-channel signals into a plurality of angularly dispersed channels separated from each other by an angular dispersion;

a first angular dispersion amplifier, operative to receive the angularly dispersed channels and to selectively extract a first fraction of the angularly dispersed channels by amplifying the angular dispersion thereof; and one second and one third angular dispersion amplifier so arranged to selectively extract a second fraction of the angularly dispersed channel and to further amplify the angular dispersion of the first fraction of the angularly dispersed channels extracted by the first angular dispersion amplifier, respectively.

* * * * *